(12) United States Patent
Robertson

(10) Patent No.: US 9,656,588 B2
(45) Date of Patent: May 23, 2017

(54) TRAILER APPARATUSES HAVING TRAVERSE HYDRAULIC TAIL

(71) Applicant: Fontaine Commercial Trailer, Inc., Haleyville, AL (US)

(72) Inventor: Neil Harrison McNeil Robertson, Lawrenceville, GA (US)

(73) Assignee: Fontaine Commercial Trailer, Inc., Haleyville, AL (US)

( * ) Notice: Subject to any disclaimer, the term of this patent is extended or adjusted under 35 U.S.C. 154(b) by 2 days.

(21) Appl. No.: 14/596,744

(22) Filed: Jan. 14, 2015

(65) Prior Publication Data
US 2016/0096464 A1    Apr. 7, 2016

Related U.S. Application Data

(60) Provisional application No. 62/058,326, filed on Oct. 1, 2014.

(51) Int. Cl.
*B60P 1/43* (2006.01)
*B60P 3/06* (2006.01)
*B62D 53/06* (2006.01)

(52) U.S. Cl.
CPC .......... *B60P 1/433* (2013.01); *B60P 3/06* (2013.01); *B62D 53/062* (2013.01)

(58) Field of Classification Search
CPC   B60P 3/062; B60P 3/064; B60P 1/433; B60P 1/43; B60P 3/06; B60P 3/066; B60P 3/07; B62D 53/062
See application file for complete search history.

(56) References Cited

U.S. PATENT DOCUMENTS

| 2,173,277 | A | 9/1939 | Jarmin et al. |
| 2,789,714 | A | 4/1957 | Norris |
| 3,064,842 | A | 11/1962 | Haynie |
| 3,834,565 | A | 9/1974 | Goodman, Jr. et al. |
| 4,125,198 | A | 11/1978 | Landoll |
| 4,136,791 | A | 1/1979 | Clark |
| 4,231,710 | A | 11/1980 | Landoll |
| 4,372,727 | A | 2/1983 | Fredrickson et al. |

(Continued)

OTHER PUBLICATIONS

Brochure for Trail King Industries, Inc. Advantage Series Hydraulic Tail Trailer (4 pages).

(Continued)

*Primary Examiner* — Andrew J Triggs
(74) *Attorney, Agent, or Firm* — Andrus Intellectual Property Law, LLP

(57) ABSTRACT

A tail trailer includes a main deck mounted on a main frame, a main tail pivotally connected to a rearward end of the main deck and a flip tail pivotally secured to a rearward end of the main tail. The flip tail is movable between a folded position beneath the main tail and an unfolded position extending outwardly from the rearward end of the main tail. A lifting and holding assembly is provided between the main frame and the main tail for pivotally moving and maintaining a desired position of the main tail and the flip tail relative to the main deck. A combined locking and supporting arrangement beneath the main tail provides ground engaging support for the main tail, and also provides locking engagement for holding the flip tail in the folded position.

5 Claims, 11 Drawing Sheets

(56) References Cited

U.S. PATENT DOCUMENTS

| | | | |
|---|---|---|---|
| 4,498,836 A * | 2/1985 | Love | B60P 1/433 |
| | | | 14/71.3 |
| 4,568,235 A | 2/1986 | Bills, Jr. | |
| 4,647,270 A * | 3/1987 | Maloney | B60P 1/43 |
| | | | 296/61 |
| 4,702,662 A | 10/1987 | Marlett | |
| 5,013,056 A | 5/1991 | Landoll et al. | |
| 5,033,931 A | 7/1991 | Mann | |
| 5,051,053 A | 9/1991 | Groeneweg | |
| 5,094,583 A | 3/1992 | Bills, Jr. et al. | |
| 5,211,413 A | 5/1993 | Williams et al. | |
| 5,215,426 A | 6/1993 | Bills, Jr. | |
| 5,234,308 A | 8/1993 | Mann | |
| 5,490,754 A | 2/1996 | Voelzke | |
| 5,667,231 A | 9/1997 | Dierks et al. | |
| 6,149,369 A | 11/2000 | Reed | |
| 6,161,997 A | 12/2000 | Furlong | |
| 6,241,450 B1 | 6/2001 | Gehman | |
| 6,386,819 B1 * | 5/2002 | Schultz | B60P 1/26 |
| | | | 414/502 |
| 6,394,734 B1 | 5/2002 | Landoll et al. | |
| 7,497,494 B1 | 3/2009 | Good | |
| 7,547,178 B1 * | 6/2009 | Dierks | B60P 1/43 |
| | | | 414/484 |
| 7,658,587 B1 * | 2/2010 | Dierks | B60P 1/43 |
| | | | 280/790 |
| 2004/0098818 A1 * | 5/2004 | Kennedy | B63B 27/143 |
| | | | 14/69.5 |
| 2008/0231016 A1 | 9/2008 | Wall | |
| 2013/0189059 A1 * | 7/2013 | Hall | B60P 3/122 |
| | | | 414/480 |

OTHER PUBLICATIONS

Brochure for Trail King Industries, Inc. Advantage Series Hydraulic Sliding Tail (HST) (4 pages).

Web pages for TrailMax Tiltbed Trailers dated Oct. 15, 2014 (2 pages) (http://web.archive.org/web/20040305192802/http://trailmax.com/Tiltbed/tilt-2.htm).

Specifications for TrailMax Tiltbed Trailer Model TD-40-T (5+24) dated Oct. 15, 2014 (2 pages) (http://web.archive.org/web/20040404003858/http://www.trailmax.com/Tiltbed/td-40-t(5+24).htm).

Specifications for TrailMax Medium Hydraulic Tail Trailer Model TD-24-HT(E) (2 pages).

Web page specifications for 1995 ETNYRE SR35 TL Hydraulic Tail Lowboy Trailer dated Oct. 20, 2014 (2 pages) (http://www.truckpaper.com/listingsdetail/printdetail.aspx?OHID=5386347).

* cited by examiner

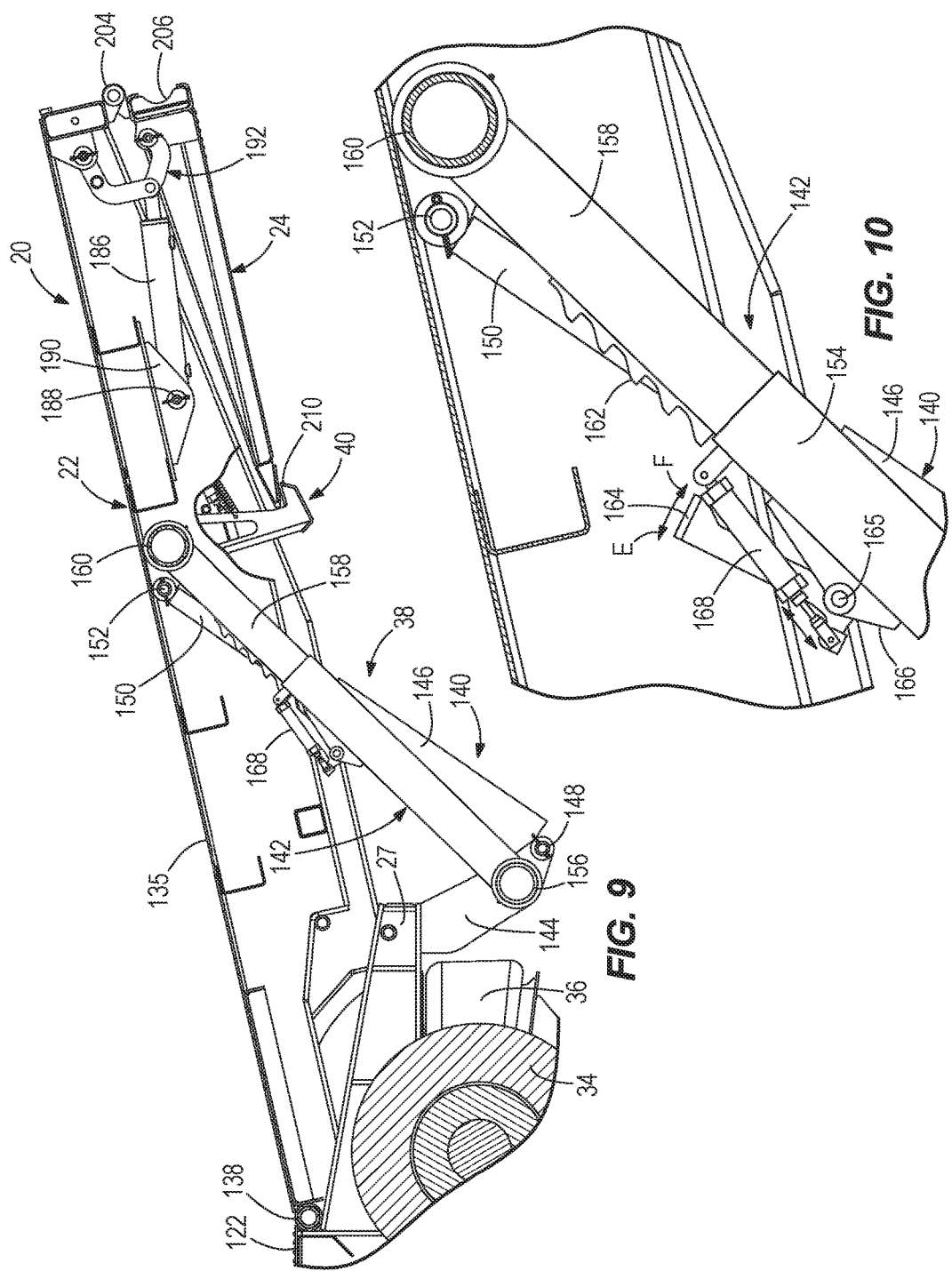

TRAILER APPARATUSES HAVING TRAVERSE HYDRAULIC TAIL

CROSS-REFERENCE TO RELATED APPLICATION

The present utility application relates to and claims priority to U.S. Provisional Patent Application No. 62/058,326, filed Oct. 1, 2014, which is incorporated herein in entirety.

FIELD

The present disclosure relates to trailer apparatuses for transporting machinery, goods, equipment and general cargo. More particularly, the present disclosure pertains to a fluid actuated tail trailer wherein a foldable tail assembly is hingedly connected to a main deck of the main frame of the trailer.

BACKGROUND

The following U.S. Patents are incorporated herein by reference in entirety:

U.S. Pat. No. 5,490,754 discloses a trailer comprising a lower main deck and an upper deck positioned forwardly and upwardly of the main deck and including an upper deck ramp positioned at the forward end of the main deck which may be pivotally moved upwardly so that freight or equipment may be moved upwardly thereon from the main deck to the upper deck. Pivotally connected upper and lower scissor arms are provided at the opposite sides of the forward end of the upper deck ramp. A hydraulic cylinder is connected to each of the lower scissor arms adjacent the upper end thereof. The upper cud of each of the upper scissor arms is connected to the forward end of the upper deck ramp with the lower end of the lower scissor arms being pivotally connected to the trailer frame. Extension of the hydraulic cylinders causes the scissor arms to spread apart to raise the upper deck ramp from a stored position to an inclined position. When the upper deck ramp is in its inclined position, the weight of the load on the upper deck ramp is carried by the scissor arms and is not carried by the hydraulic cylinders.

U.S. Pat. No. 7,547,178 discloses a hydraulic tail trailer comprising a main deck having a main trail assembly pivotally connected to the rearward end thereof with the pivotal connection therebetween being located forwardly of the centerline of the rear axle of the trailer suspension system. The location of the hinge between the main deck and the main tail assembly, by being located forwardly of the centerline of the rear axle, provides a main tail having an increased length thereby providing a lower loading angle without increasing the overall length of the trailer.

U.S. Pat. No. 7,658,587 discloses a hydraulic tail trailer comprising a main deck having a main tail assembly pivotally connected to the rearward end thereof with the pivotal connection therebetween being located forwardly of the centerline of the rear axle of the trailer suspension system. The location of the hinge between the main deck and the main tail assembly, by being, located forwardly of the centerline of the rear axle, provides a main tail having an increased length thereby providing a lower loading angle without increasing the overall length of the trailer. The forward end of the main deck is pivotally connected to the rearward end of an upper deck so that the main deck may be raised which further reduces the angle between the rearward end of the main deck and the forward end of the main tail for loading and unloading purposes.

Through research and experimentation, the inventor has determined a need exists to design and construct a fluid actuated tail trailer to better facilitate the safe and efficient loading of heavy cargo, and to provide enhancements in actuating, supporting and locking loading structures movably connected to front and rear portions of the main frame or main deck of the trailer.

SUMMARY

In one example, the present disclosure relates to a tail trailer supported for movement on a ground surface. The trailer includes a main deck mounted on a wheeled main frame and provided with a forward end and a rearward end. A tail assembly has a rearward end configured to engage the ground surface and a forward end pivotally coupled to the rearward end of the main deck. A lifting and holding assembly is provided for pivotally moving and maintaining the tail assembly in a desired position relative to the main deck. The lifting and holding assembly includes at least a first extendable and retractable piston cylinder connected between the main frame and the tail assembly and configured to raise and lower the tail assembly to the desired position relative to the main deck. At least one telescopic support arm is connected between the main frame and the tail assembly, and is configured to extend and retract in response to operation of the first piston cylinder. The support arm is further configured with a locking arrangement to retain the desired position of the tail assembly relative to the main deck.

In another example, a tail trailer is supported for movement on a ground surface and includes a main deck mounted on a wheeled main frame and provided with a forward end and a rearward end. A main tail has a rearward end and a forward end pivotally connected to the rearward end o the main deck. A flip tail has a rearward end configured to engage the ground surface, and a forward end pivotally secured to the rearward end of the main tail. The flip tail is movable between a folded position beneath the main tail, and an unfolded position extending outwardly from the rearward end of the main tail. A lifting and holding assembly is connected between the main frame and the main tail for pivotally moving and maintaining the main tail and the flip tail in a desired position relative to the main deck. A combined locking and supporting arrangement is mounted beneath the main tail, and is configured to provide ground engaging support for the main tail when the rearward end of the flip tail engages the ground, and to provide locking engagement with the rearward end of the flip tail when the flip tail is in the folded position beneath the main tail.

In a further example, a tail trailer used in loading and unloading operations includes a wheeled main frame having a forward end and a rearward end. A main deck is mounted on the wheeled main frame and is provided with a forward end and a rearward end. A tail assembly has a rearward end adapted to engage a ground surface, and a forward end pivotally coupled to the rearward end of the main deck. An upper deck has a forward end adapted to be coupled to a towing vehicle, and a rearward end connected to a forward end of the wheeled main frame. A transfer deck has a pair of side members, a forward end lying adjacent the rearward end of the upper deck and a rearward end pivotally attached to a forward end of the main deck. The transfer deck is pivotally movable between a lowered stowed position serving as a coplanar extension of the main deck, and a raised loading positon extending upwardly from the main deck to the rearward end of the upper deck. A lifting system is located between the main frame and the transfer deck, and is configured with a sliding motion translating arrangement within the transfer deck for raising and lowering the transfer deck relative to the main deck.

BRIEF DESCRIPTION OF THE DRAWINGS

FIGS. 9 and 10 are enlarged fragmentary views in partial cross sections showing a lifting and holding arrangement and a supporting and locking structure beneath the main tail;

DETAILED DESCRIPTION

Figure 1:
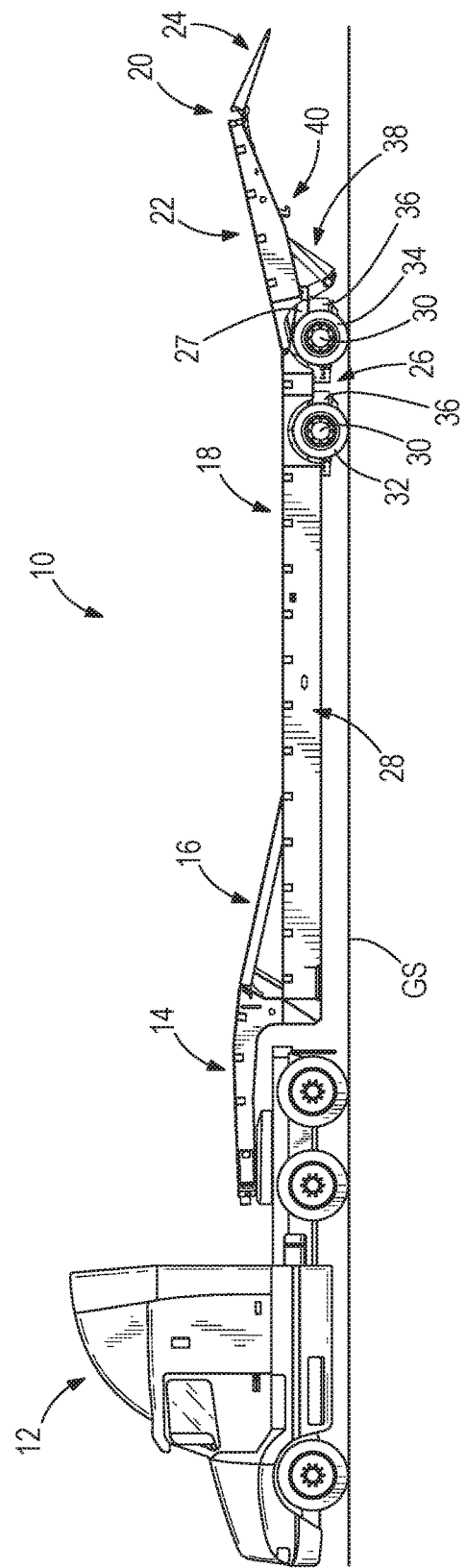
FIG. 1 is a side view of a hydraulic tail trailer hitched to a towing vehicle and shown in a tail unfolding position.
Figure 2:
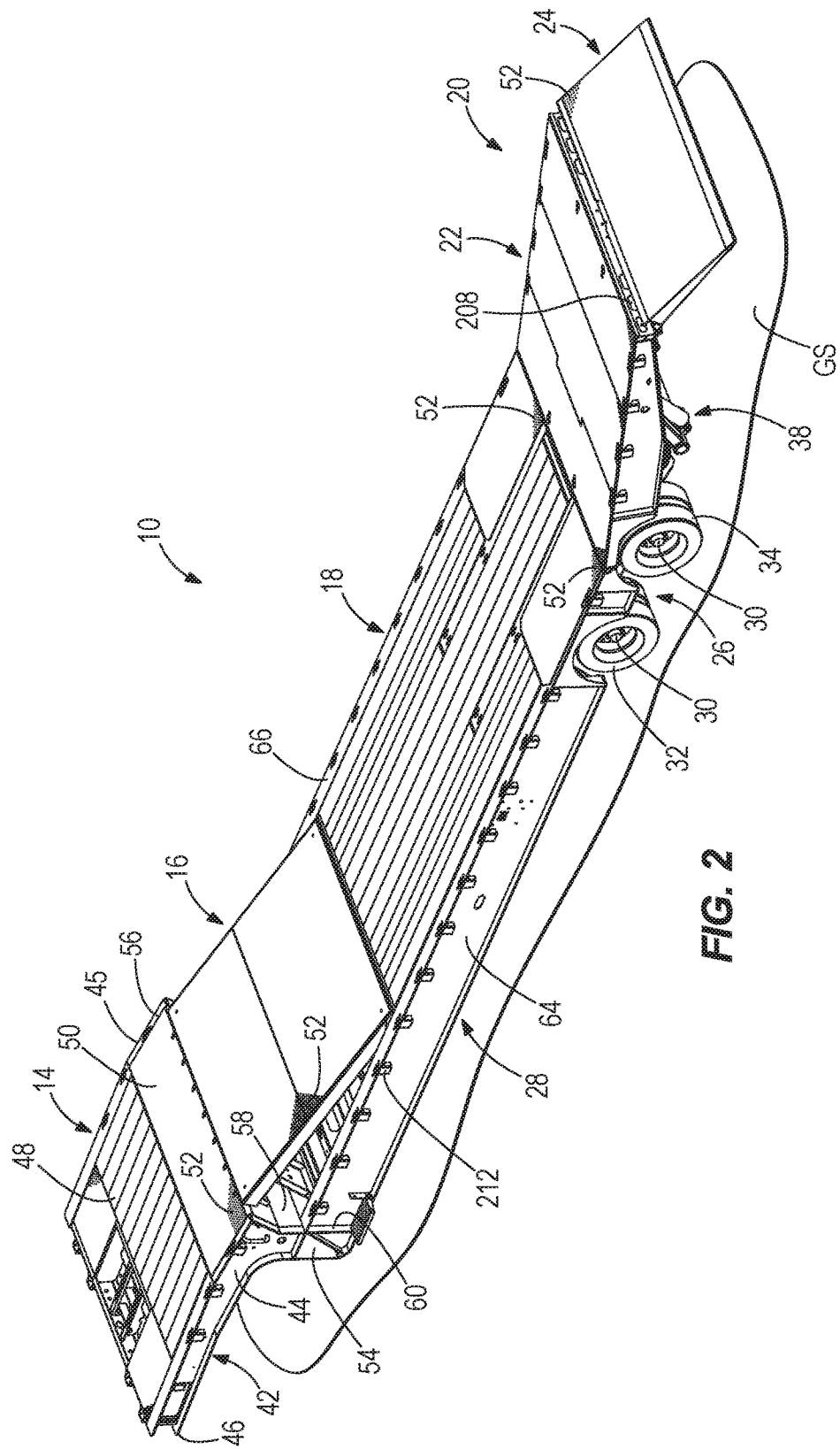
FIG. 2 is a top perspective view of the trailer shown in FIG. 1 with the towing vehicle removed.

Referring now to the drawings, a hydraulic tail trailer 10 is shown in a tail unfolding position in FIG. 1 coupled behind a towing vehicle 12 supported on a ground surface GS. The trailer 10 is generally comprised of an upper deck 14, a transfer deck 16, a main deck 18, and a hydraulic tail assembly 20 defined by a main tail 22 and a flip tail 24.

A wheeled undercarriage 26 is secured beneath a rearwardly and downwardly extending subframe 27 of a main frame 28 of the main deck 18, and provides support for the trailer 10 during transport, loading and unloading thereof. The undercarriage 26 is constructed with a pair of axles 30, a set of front and rear wheels 32, 34, respectively, and a pair of suspension assemblies 36 for enabling cushioning and shock absorbing of the trailer 10. As will be further discussed hereafter, a lifting and holding assembly 38 is positioned between the main tail 22 and the main frame 28. In addition, a combined supporting and locking arrangement 40 is provided beneath the main tail 22, and is designed both to provide ground engaging support for the main tail 22 during loading and unloading operations, and to secure the flip tail 24 beneath the main tail 22 during transport of the trailer 10.

With further reference to FIGS. 2-5, the upper deck 14 includes an upper deck frame 42 having side beams 44, 45 which extend rearwardly from a front end 46 thereof for supporting an upper loading surface 48 and rear ramp plate 50 provided with an anti-slip surface 52. The side beams 44, 45 are formed with downwardly extending rear portions 54, 56 forming a transverse rear wall 58. The rear portions 54, 56 of the upper deck 14 are integrally connected to forward ends 60, 62 of a pair of longitudinally extending main support beams 64, 66 defining opposite sides of the main frame 28.

Figure 3:
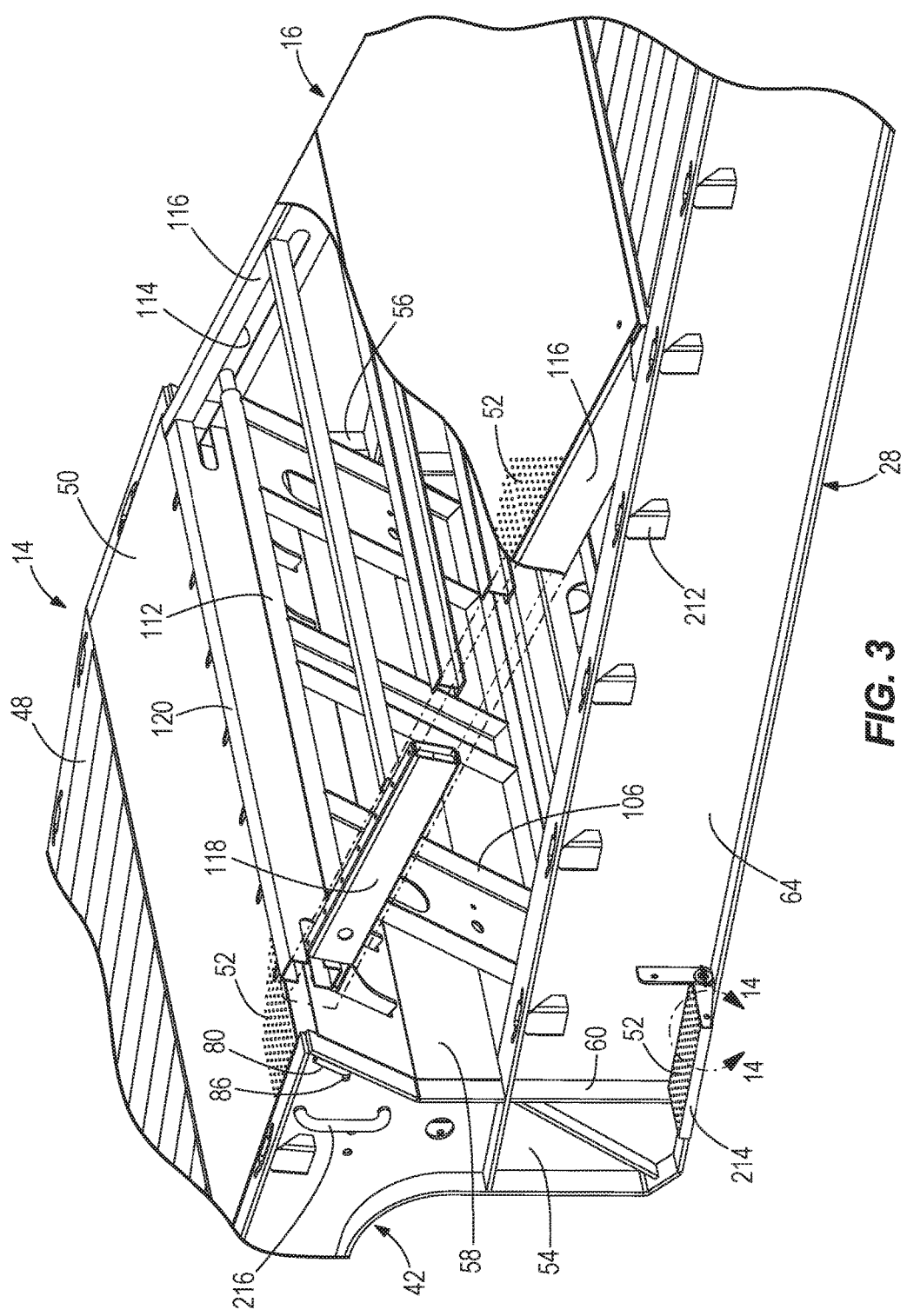
FIG. 3 is an enlarged fragmentary perspective and detail view of a transfer deck of the trailer shown in FIG. 2.
Figure 4:
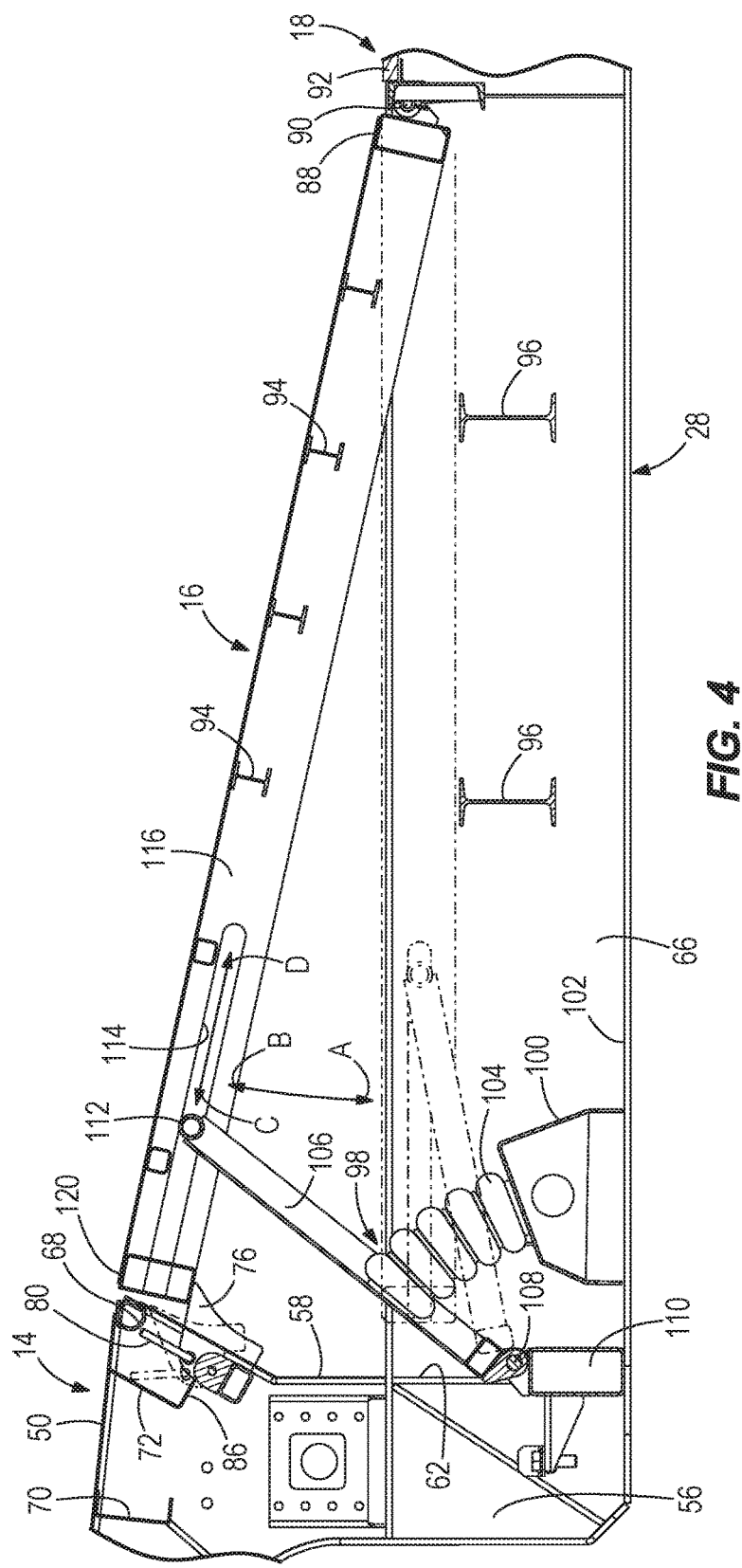
FIG. 4 is a partial longitudinal sectional view of the transfer deck shown in FIG. 3.
Figure 5:
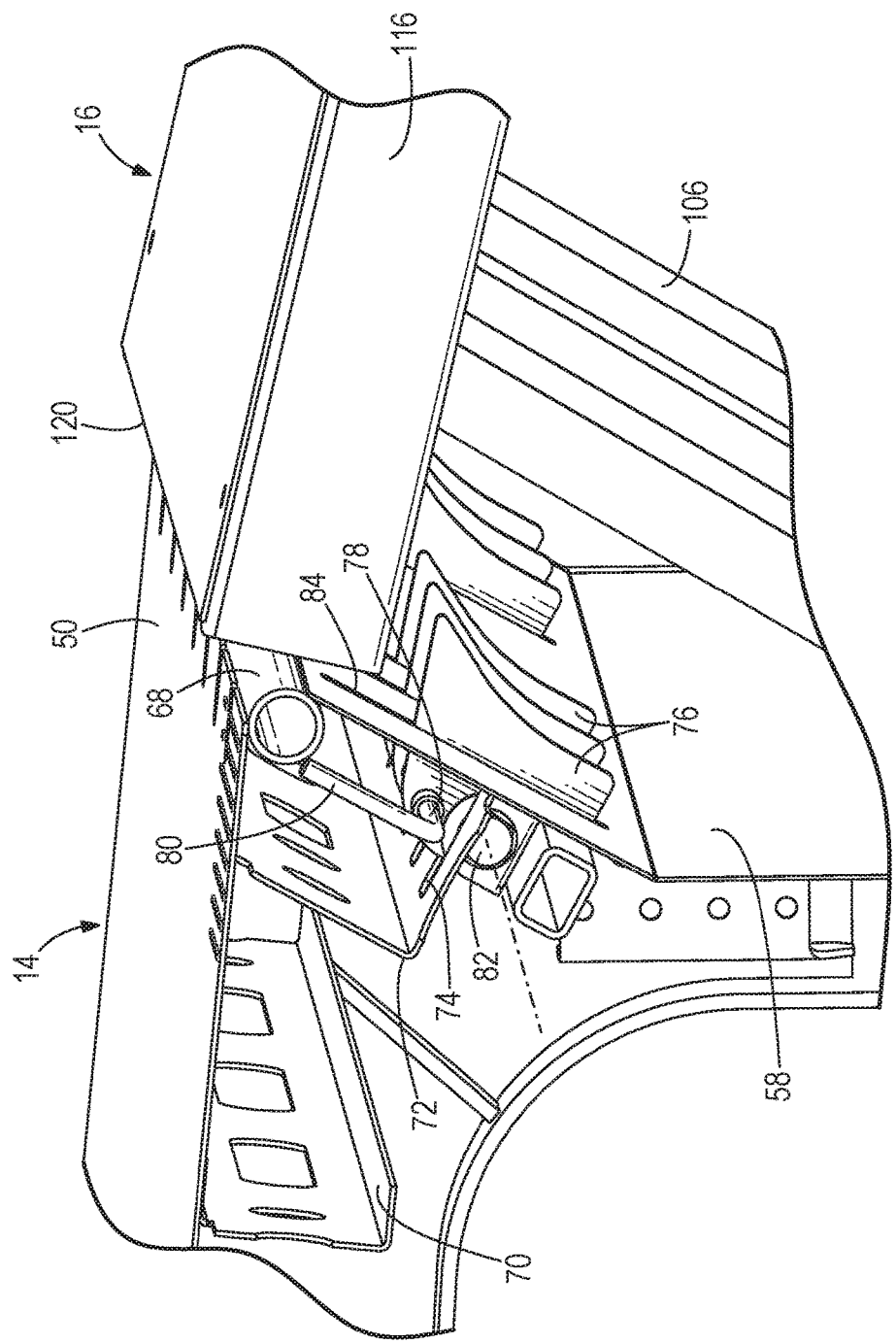
FIG. 5 is an enlarged broken into detail view of a gravity lock structure used on the transfer deck shown in FIGS. 3 and 4.

As best seen in FIG. 5, a support tube 68 extends across a rear end of the upper deck 14, and is located beneath the rear end of the rear ramp plate 50 and above an upper end of the rear wall 58. A first brace 70 and a second brace 72 are fixed transversely beneath the upper deck 14 and provide structural reinforcement thereof. The second brace 72 is formed with a series of slots 74 for receiving, a set of movable gravity lock plates 76 that are connected to a control rod 78 having a handle 80 which is accessible laterally of the upper deck 14. The plates 76 are mounted for rotation about a tube 82, and are designed to normally project by gravity into an extended support position through a group of slots 84 formed across an upper portion of the rear wall 55. In this support position as shown in FIGS. 3 and 4, the gravity lock plates 76 function to hold the forward end of the transfer deck in a raised loading position as will be further described below. Manually pulling the handle 80 forwardly moves the control rod 78 along an opening 85 (FIGS. 3 and 4) formed in the upper deck frame 42. At the same time, the plates 76 are moved forwardly through the slots 84 to a retracted release position depicted in dotted lines in FIG. 4 when it is desired to move the transfer deck 16 from the raised loading position.

Figure 11:
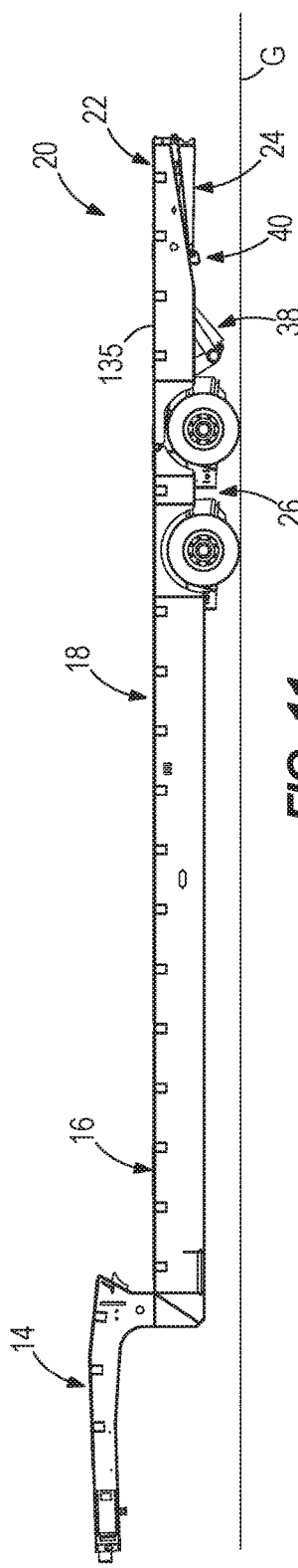
FIG. 11 is a side view of the trailer in a transport position.

As illustrated best in FIG. 4, the transfer deck 16 has a rear end 88 which is pivotally connected by a pivot pin 90 to a front end 92 of the main deck 18. With this construction, the transfer deck 16 is movable as represented by arrows A and B between a lowered stowed position shown in dotted lines, and the raised loading position shown in solid lines. When it is in its lowered stowed position, the transfer deck 16 forms a continuation of the main deck 18 which extends towards the rearward wall 58 of the upper deck 14. That is, upper surfaces of the transfer deck 16 and the main deck 18 are coplanar with each other such that the transfer deck 16 and the main deck 18 are horizontally disposed relative to the ground surface GS in the transport positon as seen in FIG. 11. In the lowered position, the transfer deck 16 is designed such that a pair of side members 116 is supported upon transverse cross beams 96 traversing the width of the main frame 28. When the transfer deck 16 is in its raised loading position, the transfer deck 16 is ramped or inclined forwardly so that objects loaded on the trailer 10 can be transferred from the main deck 18 to the upper deck 14.

The transfer deck 16 is provided with a lifting system 98 located between the main frame 28 and the transfer deck 16, and is configured with a sliding motion translating arrangement for facilitating raising and lowering of the transfer deck 16 relative to the main deck 18. In the example shown, the lifting system 98 includes a pair of pneumatically operated bellows units, each being provided with a suitable source of pressurized air and mounted on opposite sides of the main frame 28, supported on a crossmember 100 extending between the main support beams 64, 66 and positioned upon a lower mounting surface 102. One such air bellows unit includes a flexible, expandable and retractable conduit 104 having an upper end secured to a lever arm 106 in the example shown, the lever arm 106 takes the form of a rigid framework extending substantially across the transfer deck 16. A lower end of the lever arm 106 is pivotally connected by a pin 108 to a support member 110 positioned at the front of the main frame 28. An upper end of the lever arm 106 is provided with a transversely extending tube 112 having outer end portions which project through elongated slots 114 formed in inner walls of the side members 116 of the transfer deck 16, and are secured to rails, one being seen at 118 (FIG. 3) that are designed to slide within the side members 116.

When it is desired to move the transfer deck 16 from the lowered stowed position, each air bellows unit 104 is actuated to provide a pneumatic force to upwardly swing the lever arm 106 about the pivot pin 108 and, at the same time cause the outer end portions of the tube 112 to move slightly forwardly in the slots 114 and the rails 118 to slide in the side members 116. Sliding motion of the outer end portions of the lever arm tube 112 in the slots 114 and the rails 118 in the side members 116 along with the swinging of the lever arm 106 about pivot pin 108 is translated into pivoting and raising the transfer deck 16 about the pivot pin 90 at the front end of the main deck 18. This movement continues until a forward end 120 of the transfer deck 16 engages and moves the gravity lock plates 76 to the retracted position as shown in dotted lines. Once the forward end 120 has been raised to a sufficient height, the gravity lock plates 76 will move by gravity to their extended support position, and each air bellows unit 102 is then used to lower the transfer deck 16 so that the forward end 120 is supported and maintained upon the gravity lock plates 76.

When it is desired to lower the transfer deck 16, an operator uses the handle 80 to manually retract the gravity lock plates 76, and each air bellows unit 104 is used with the lever arm 106 to lower the transfer deck 16 back to its lowered stowed position. Thus, it can be appreciated that during the raising and lowering of the transfer deck 16, the lever arm 106 pivots about the pin 108, the outer end portions of the tube 112 travel back and forth in the direction of arrows C and D and the transfer deck 16 swings about the pivot pin 90.

Figure 6:
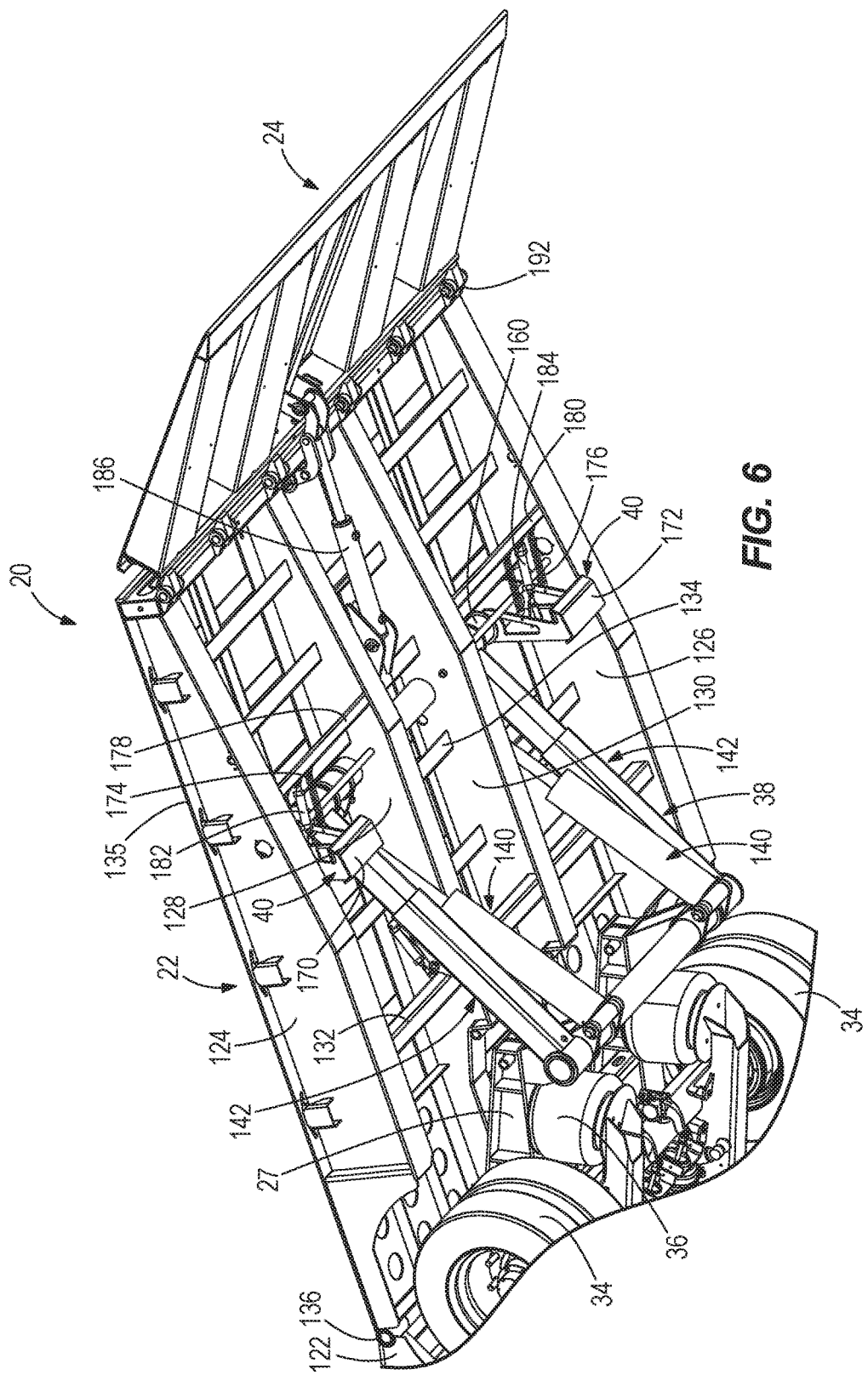
FIG. 6 is an enlarged fragmentary bottom perspective view of a main tail and a flip tail of the trailer shown in FIG. 1 showing a lifting and holding arrangement and a supporting and locking leg structure beneath the main tail.
Figure 7:
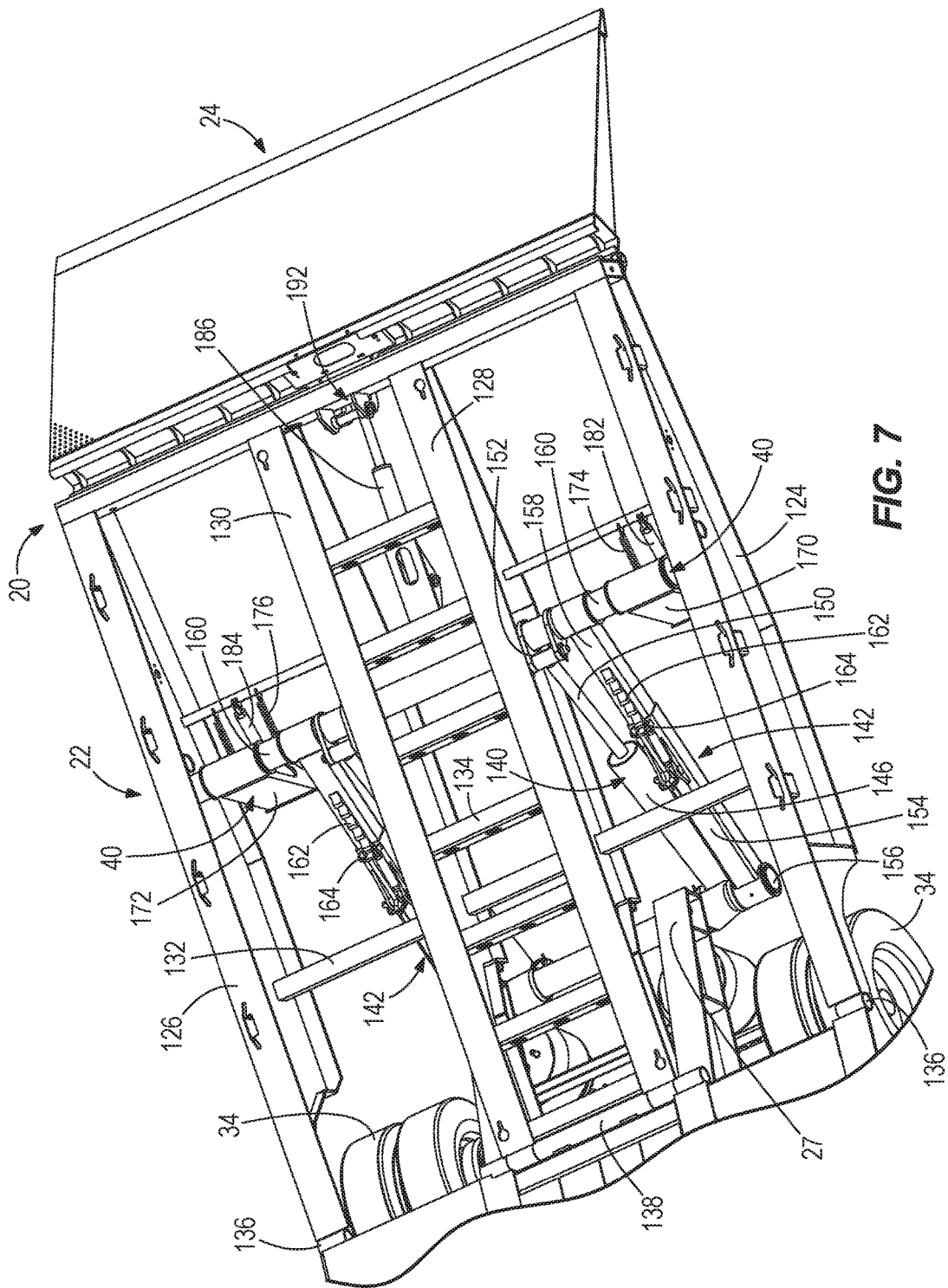
FIG. 7 is broken away top perspective view of the main tail and the flip tail shown in FIG. 6.

Referring now to FIG. 6-10, the hydraulic tail assembly 20 is pivotally connected to a rear end 122 of the trailer main frame 28, and is formed by the main tail 22 and the flip tail 24. The flip tail 24 is designed to be moved between a folded position beneath the main tail 22 and an unfolded position extending outwardly and rearwardly of the main tail 22. The main tail 22 includes a pair of spaced apart side beams 124, 126 and a pair of intermediate beams 128, 130 located between the side beams 124, 126. Various cross beams 132, 134 are secured to and extend between the beams 124, 126, 128, 130. The beams 124, 126, 128, 130 and the cross beams 132, 134 provide support for a planar main tail deck 135. As best seen in FIG. 7, forward ends of the side beams 124, 126 are hingedly joined by pivots 136 to the rear end 122 of the main deck 18 of the main frame 28. Forward ends of the intermediate beams 128, 130 are hingedly secured by a pivot tube connection 138 to the subframe 27 of the main frame 28. The pivots 136 and the pivot connection 138 define a common pivot axis about the rear wheels about which the tail assembly 20 swings.

The lifting and holding assembly 38 extends between the main frame 28 and the underside of the main tail 22, and is used in selective raising and lowering of the tail assembly 20. The assembly 38 includes a pair of hydraulic cylinders 140 and a pair of support arms 142 for holding and locking, the hydraulic cylinders 140 in a desired position. As most clearly seen in FIG. 9, the subframe 27 includes a cylinder bracket 144 to which a lower end of a base 146 of each hydraulic cylinder 140 is pivotally connected at pivot connection 148. As seen in FIG. 7, an upper end of a rod 150 of each hydraulic cylinder 140 is pivotally connected to an underside of the main tail 22 by a pivot connection 152 about a tube 160. The cylinders 140 are suitably connected to a source of hydraulic fluid and can be extended and retracted to raise and lower the tail assembly 20. It should be understood that the present disclosure also contemplates that the hydraulic cylinders 140 could be suitably replaced by other fluid actuated cylinders, such as pneumatic, cylinders.

Each of the support arms 142 includes a lower portion 154 having a lower end pivotally attached by a pivot arrangement 156 to the bracket 144. An upper portion 158 extends and retracts in telescopic fashion relative to the lower portion 154 in response to movement of each hydraulic cylinder 140. An upper end of each upper portion 158 is pivotally secured about the tube 160 to an underside of the main tail 22 at a location rearwardly of each pivot pin 152. As seen in FIG. 10, each upper portion 158 is constructed with a tooth rack 162 which is selectively engaged and disengaged with a movable locking bar member 164 that is pivotally attached at 165 to a bracket 166 mounted on the lower portion 154 of each support arm 142. Each support arm 142 is designed such that as the upper portion 158 extends from the lower portion 154, the locking, bar member 164 engages the tooth rack 162 and locks the member 164 in the tooth rack 162 when extension of the rod 150 stops during raising of the main tail 22. Each lower portion 154 carries a fluid actuated cylinder 168, such as a pneumatic cylinder, which, when actuated, is designed to move the locking bar member 164 in the direction of arrows E and F between the position engaged with the tooth rack 162 (FIGS. 7 and 9), and a position disengaged from the tooth rack 162 (FIG. 10) wherein the tooth rack 162 rides under the locking bar member 164, such as when the main tail 22 is lowered. When the hydraulic cylinders 140 are used to move the tail assembly 20 to a desired position, the support arms 142 by means of locking action, function to support the weight of the tad assembly 20 and any load placed thereon, and prevent collapse of the tail assembly 20 in the event of any catastrophic failure of the hydraulic cylinders 140.

As seen in FIGS. 6, 7 and 9, the combined locking and supporting arrangement 40 includes a pair of L-shaped support legs 170, 172 which are mounted for rotation about the pivot tube 160. Each support leg 170, 172 is normally held in an extended, downwardly directed support and locking position (FIG. 9) by a set of springs 174, 176, respectively. The springs 174, 176 are designed to hold bottom edges of the support legs 170, 172 in locking engagement with the rear end of the flip tail 24 when the flip tail 24 is moved into the folded position. Springs 174 are connected between the support leg 170 and a support cross member 178 extending between side beam 124 and the intermediate beam 128. Springs 176 are connected between the support leg 172 and a support cross member 180 extending between side member 126 and the intermediate beam 130. Respective fluid actuated cylinders 182, 184, such as pneumatic cylinders, are provided between the support legs 170, 172 and the cross members 178, 180 to enable selective pivoting of the support legs 170, 172 about the tube 160 when it is desired to release the flip tail 24 from locking engagement so it can be moved to the unfolded position. As will be appreciated hereafter, the support legs 170, 172 provide ground engaging support for the tail assembly 20 during loading and unloading, and also provide a positive locking of the flip tail 24 beneath the main tail 20 when the trailer 10 is the transport position.

As also seen FIGS. 6, 7 and 9, a single fluid actuated cylinder 186 is provided beneath the main tail 22 to permit power folding and unfolding of the flip tail 24 relative to the main tail 22. The cylinder 186 has a base end pivotally connected by a pin 188 to a mounting bracket 190 depending, from the underside of the main tail 22. A rod end of the cylinder 186 is connected to a pivot connection 192 provided between a rear end of the main tail 22 and a forward end of the flip tail 24. The pivot connection 192 enables pivotal movement between the main tail 22 and the flip tail 24 when cylinder 186 is actuated.

Figure 8:
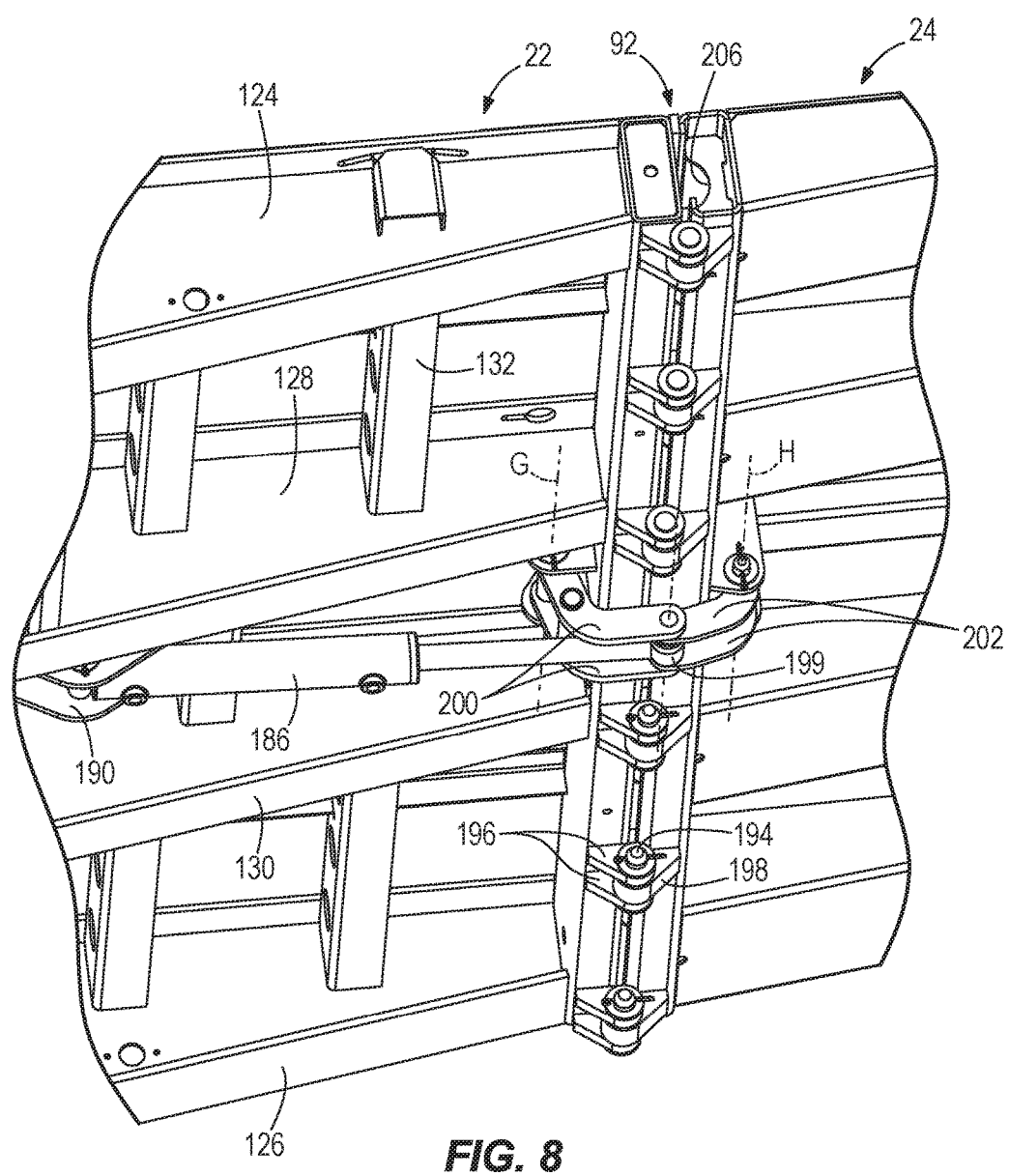
FIG. 8 is an enlarged fragmentary bottom perspective view of a pivot connection between the main tail and the flip tail.

With further reference to FIG. 8, the pivot connection 192 includes a set of spaced apart pivot pins 194 joining cooperating ears 196, 198 provided between the main tail 22 and the flip tail 24, respectively. In addition, the rod end of the cylinder 186 is pivotally connected at 199 between a first pair of brackets 200 and a second pair of brackets 202. The brackets 200 are pivotally connected about an axis C to the underside of main tail 22. The brackets 202 are pivotally connected about an axis H to the underside of flip tail 24. As illustrated in FIG. 9, the rear end of the main tail 22 has a cylindrical member 204 which represents the pivot point for the flip tail 24. A recess 206 formed in the front end of the flip tail 24 provides clearance for various lights, such as shown at 208 (FIG. 2) located in the rear end of the main tail 22 which lights are functional when the flip tail 24 is folded beneath the main tail 22 in the transport position.

An operation of the trailer 10 is described as follows. Normally, when the trailer 10 is parked on a flat ground surface GS, in the transport position shown in FIG. 11, the transport deck 16 is coplanar with the main deck 18 as well as the deck 135 of the main tail 22. Flip tail 24 is pivoted to its folded position beneath the main tail 22 such that the tail end 210 of the flip tail 24 is locked into engagement with the support and locking arrangement 40 as more clearly seen in FIG. 9.

Figure 12:
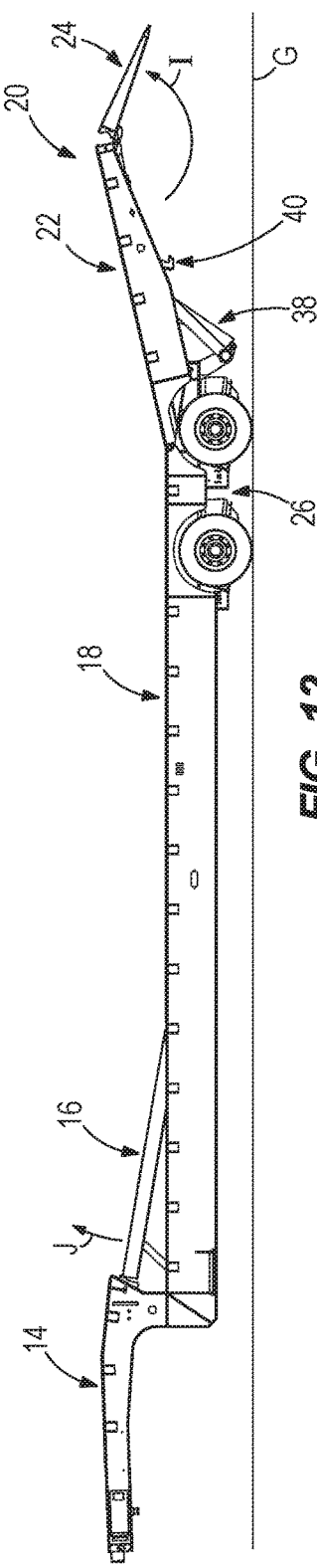
FIG. 12 is side view of the trailer in the tail unfolding position.
Figure 13:
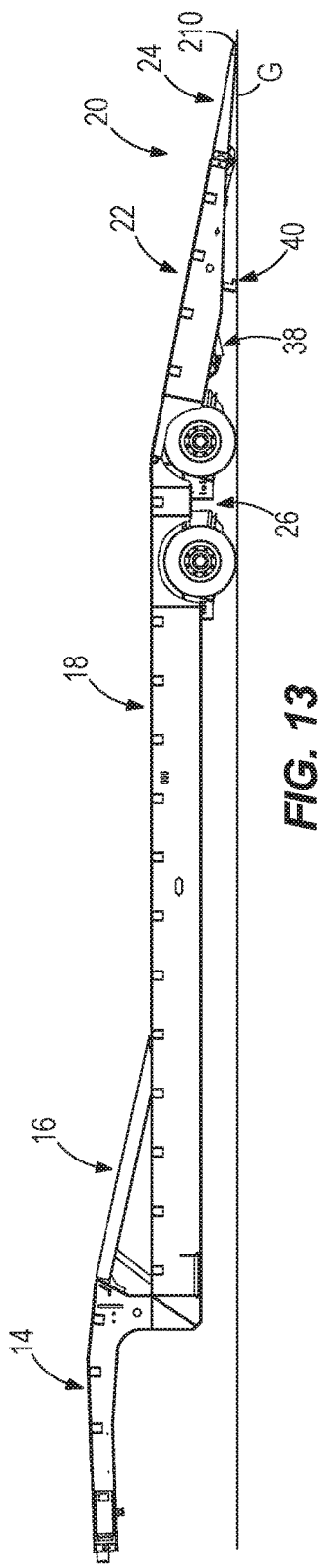
FIG. 13 is side view of the trailer in a ground engaging loading position.

When it is desired to initiate an exemplary loading operation, such as illustrated in FIG. 12, the lifting and holding assembly 38 is used to raise the main tail 22 until there is sufficient clearance to unfold the flip tail 24. The cylinders 182, 184 are then actuated to pivot the supporting and locking arrangement 40 so that the tail end 210 of the flip tail 24 is released from locking engagement, and the cylinder 186 is energized to unfold the flip tail 24 in the direction of arrow 1. When the flip tail 24 has been completely unfolded such that the upper surfaces of the main tail 22 and the flip tail 24 are coplanar, the tail assembly 20 may be lowered until the support legs 170, 172 of the supporting and locking arrangement 40 and the tail end 210 of the flip tail 24 engage the ground surface GS as shown in FIG. 13. The operator can choose at this point whether or not to introduce a conventional air suspension dump valve to assist in creating as shallow a loading angle as possible. Alternatively, to use a tail assembly 20 as a deck loading/leveler platform, the main tail 22 and the unfolded flip tail 24 can be suitably raised and lowered into alignment with a loading dock as the trailer 10 is positioned relative thereto.

Before loading commences, the transfer deck 16 is moved to its raised loading position in the direction of arrow J using the lifting system 98 as previously described above. Objects may then be loaded onto the trailer 10 using the unfolded tail assembly 20, the main deck 18, the transfer deck 16 and the upper deck 14 as desired. Loaded objects may be secured using stakes placed in pockets 212 (FIG. 3) provided along the sides of the trailer 10. Access may be made to the upper deck 14 and transfer deck 16 using a folding access step 214 and a grab handle 216 (FIG. 3). Once a loading operation is finished and the loaded objects are secured, the trailer 10 may be restored to its transport position of FIG. 11 by reversing the operation set forth above. Thereafter, the trailer 10 may be pulled by the towing vehicle 12 to its desired destination.

Figure 14:
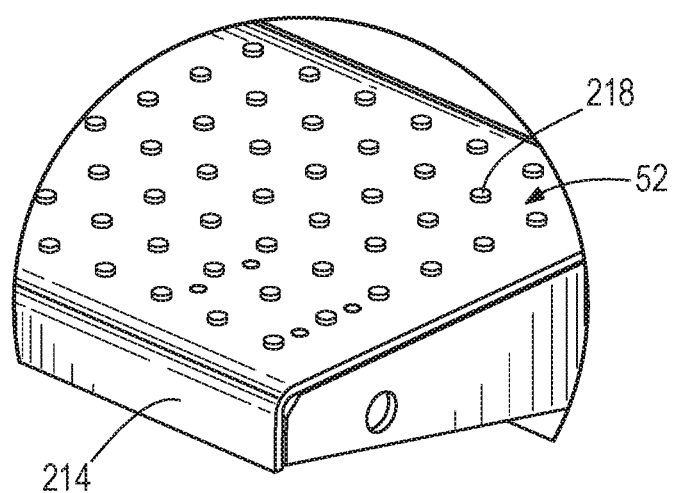
FIG. 14 is an enlarged detail view taken on line 14-14 of FIG. 3 showing, anti-slip surfaces formed on an access step and other selected areas of the trailer.

It should be appreciated that anti-slip surfaces 52 can be provided on partial or complete areas of the upper deck 14, the transfer deck 16, the main deck 18, the main tail 22 and the flip tail 24 as well as the access step 214 to provide increased traction during loading and unloading. Such anti-slip surfaces 52 are preferably formed by punching a plate partially through a thickness to form a spaced apart array of upwardly extending projections or studs 218 as shown on the access step 214 in FIG. 14.

While the preferred embodiments of the invention have been shown and described, it will be apparent to those skilled in the art that changes and modifications may be made without departing from the spirit of the invention.

What is claimed is:

1. A tail trailer supported for movement on a ground surface, the tail trailer comprising:
   a main deck mounted on a wheeled main frame and provided with a forward end and a rearward end;
   a main tail having a rearward end and a forward end pivotally connected to the rearward end of the main deck;
   a flip tail having a rearward end configured to engage the ground surface and a forward end pivotally secured to the rearward end of the main tail, the flip tail being movable between a folded position beneath the main tail and an unfolded position extending outwardly from the rearward end of the main tail;
   a lifting and holding assembly connected between the main frame and the main tail for pivotally moving and maintaining the main tail and the flip tail in a desired position relative to the main deck; and
   a combined locking and supporting arrangement mounted beneath the main tail and configured to provide ground engaging support for the main tail when the rearward end of the flip tail engages the ground surface, and to provide locking engagement with the rearward end of the flip tail when the flip tail is in the folded position beneath the main tail;
   wherein the combined locking and supporting arrangement includes at least one support leg pivotally mounted beneath the main tail, the at least one support leg being configured both to engage the ground surface when the rearward end of the flip tail engages the ground surface and to engage the rearward end of the flip tail when the flip tail is in the folded position beneath the main tail.

2. The tail trailer of claim 1, wherein the combined locking and supporting arrangement includes two support legs pivotally mounted beneath the main tail.

3. The tail trailer of claim 1, wherein a piston cylinder is connected between the at least one support leg and a support member fixed beneath the main tail for selectively pivoting the at least one support leg to and from a support and locking position.

4. The tail trailer of claim 1, wherein a piston cylinder is mounted beneath the main tail for pivoting the flip tail between the folded and unfolded positions.

5. The tail trailer of claim 1, wherein anti-slip surfaces configured as an array of upwardly projecting studs are formed on at least one of the main deck, the main tail and the flip tail to provide increased traction during loading and unloading operations of the tail trailer.

\* \* \* \* \*